Figure 1:
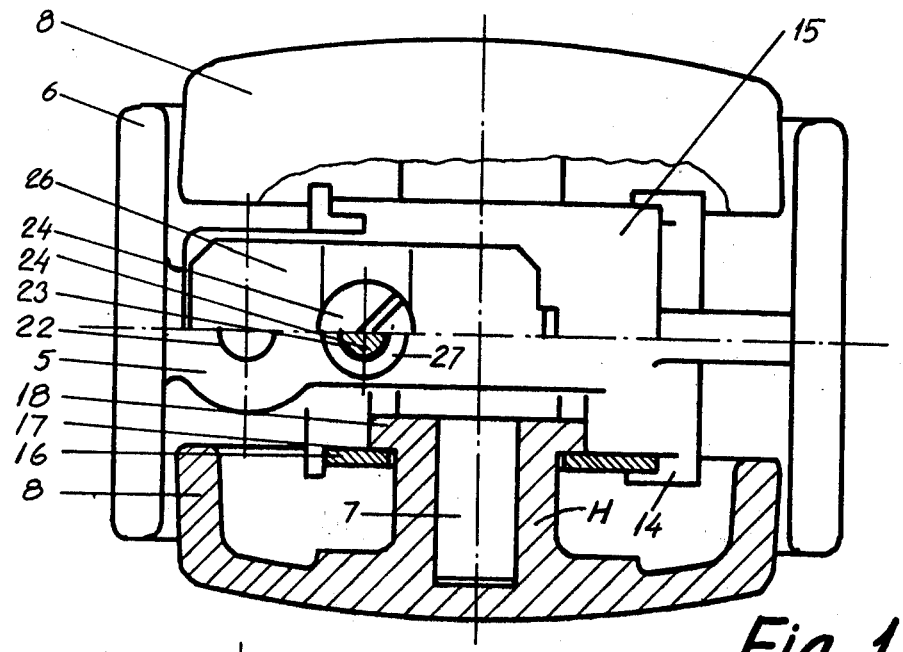

United States Patent [19]

Harlang

[11] 4,143,442
[45] Mar. 13, 1979

[54] CASTOR WITH A BRAKE DEVICE

[75] Inventor: Bent Harlang, Klampenborg, Denmark

[73] Assignee: Kevi A/S, Glostrup, Denmark

[21] Appl. No.: 842,144

[22] Filed: Oct. 14, 1977

[30] Foreign Application Priority Data

Oct. 20, 1976 [DE] Fed. Rep. of Germany ....... 4730/76

[51] Int. Cl.² .............................................. B60B 33/00
[52] U.S. Cl. .................................... 16/35 R; 188/1 D
[58] Field of Search ............. 16/35 R, 35 D; 188/1 D

[56] References Cited

FOREIGN PATENT DOCUMENTS

| | | |
|---|---|---|
| 2419167 | 11/1975 | Fed. Rep. of Germany .......... 16/35 R |
| 2516468 | 10/1976 | Fed. Rep. of Germany .......... 16/35 R |
| 2516516 | 10/1976 | Fed. Rep. of Germany .......... 16/35 R |

*Primary Examiner*—Dorsey Newton
*Attorney, Agent, or Firm*—Lawrence Rosen; E. Janet Berry

[57] ABSTRACT

Castor with a brake device and of the kind having two wheels mounted on a common axle extending through an intervening partition a bore having therein to receive the castor pivot rod. The wheels are retained on the axle by means of a locking member engaging the hubs from below and behind a flange on the hubs. By spring action the locking member is pressed against the hubs for braking the wheels and is released by increasing the load on the pivot rod.

5 Claims, 2 Drawing Figures

CASTOR WITH A BRAKE DEVICE

This invention relates to a castor being fitted with a brake device. The castor is of the kind having two wheels and, between the wheels, a partition with a through-going axle for the wheel and, displaced in relation to the axle, a vertical cylindrical bore to receive the pivot rod of the castor. Further, the partition has means for securing a removable locking or wheel braking and retaining member, which from below engages with grooves in the hubs or behind flanges on the hubs to retain the wheels on the wheel axle.

Castors of the said kind are mainly used on office chairs and in the following the object of the invention will be described in connection with such use, it being stressed, however, that this does not exclude other use thereof.

Castors of the said kind do not comply with German Standard Specifications, according to which the wheels of a castor have to be braked so that they cannot roll when the office chair is without load, but are free to roll when the chair is in use.

The object of the invention, therefore, is to provide a castor of the said kind complying with the said specifications.

According to the invention, this object is attained when, by means of a spring, the locking member is kept pressed against the hubs of the wheels, and directly or through an intermediate member against the lower end of the pivot rod, the latter having limited movability in axial direction, the arrangement being such that the pressure against the hubs is released when the load upon the pivot rod is increased.

By a suitable tightening of the spring, the locking member will be kept against the hubs of the wheels with such force that the necessary braking effect is obtained, the pivot rod at the same time being slightly elevated. By the incresed load upon the pivot, created, for instance, when a person sits down upon the chair, the locking member is pressed down corresponding to the axial movement of the pivot rod, whereby the locking effect is abolished.

In an appropriate embodiment of the castor of the invention, one end of the locking member is pivotally connected to the partition of the castor, whereas the other end has an extension passing below the pivot rod and being kept pressed against a separate member in extension of the pivot rod by means of a leaf-spring.

This allows for castors without a braking arrangement being modified in a simple manner to castors with a brake arrangement, since this involves only a change of the locking member and mounting of the said spring loading, whereas the remaining components, from which the castor is built, remain unchanged.

Figure 2:
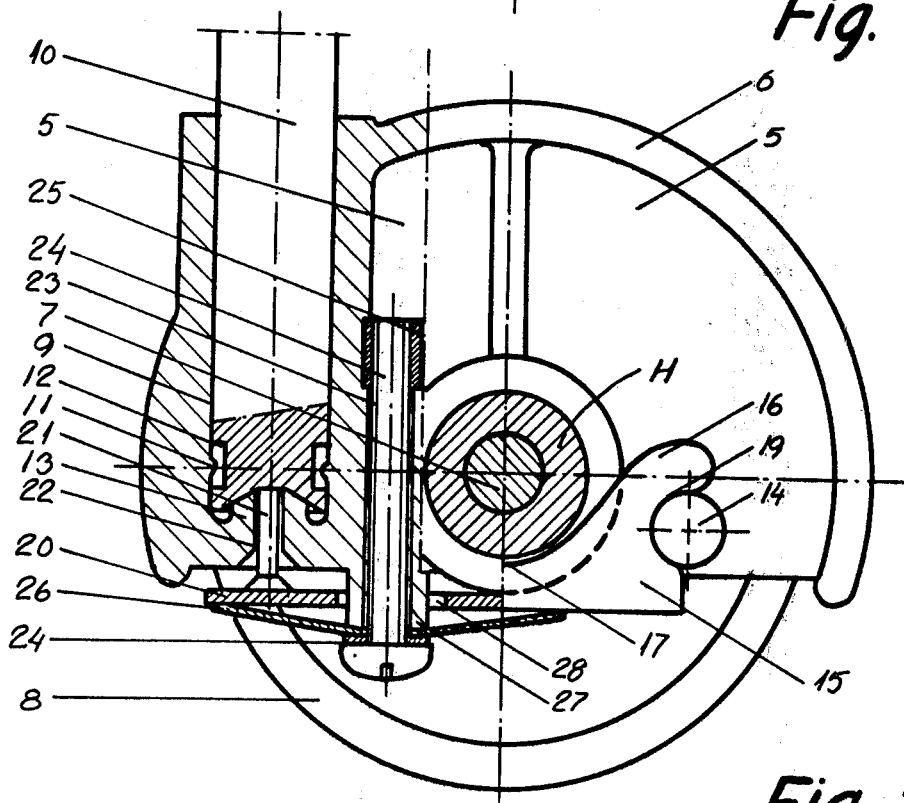

In the following, an embodiment of the object of the invention will be further described with reference to the accompanying drawing, in which FIG. 1 shows a castor with a brake devie, seen from below and partly in section, and FIG. 2 shows an elevation of same also partly in section.

The supporting structure of the castor as shown consists of a partition 5 in one piece with a wheelguard 6. A stationary axle 7 to receive the hubs H of wheels 8 on each side of the partition passes through the latter.

Displaced in respect of the axle 7, the partition 5 has a cylindrical bare 9 for a pivot rod 10, which is kept in place and permitted limited axial movement by an annular bead 11 engaging an annular groove 12 of a width to allow the pivot to be slightly raised from its support 13 at the bottom of the cylindrical bare.

On each side the partition 5 has means such as a dowel 14 for the pivotal suspension of a locking member 15, serving to retain the wheels 8 on the axle 7.

The locking member 15, serving as a wheel braking and retaining lever, is of U-shaped cross-section, and in the flanges 16, which in the cross-section make the prongs of the U, it has recesses 17, which are arcuated at the bottom with a radius corresponding to that of the hubs. Thus, they partly encircle the hubs behind a flange 18 at the free end of the hubs and prevent removal of the wheels when the locking member is placed where it belongs.

At the ends of the flanges of the locking member, semicircular cuts 19 are provided as bearings for pivotable suspension of the locking member on the dowels 14.

The bottom plate of the locking member has an extension 20 passing by the pivot rod 10, and a pin 21 in a bore 22 through the support 13 of the pivot transmits downward pressure imposed on the pivot rod to the extension 20 of the locking member.

The partition 5 further has a bore 23 to receive a screw 24 with a nut 25, serving to retain a leaf spring 26 pressing against the bottom side of the locking member 15 and resting against a collar 27 in extension of the bore 23, said collar passing through an opening 28 in the bottom plate of the locking member.

The pressure of the leaf spring 26 against the bottom side of the locking member 15 should be of a size to lift the pivot rod 10 by means of the pressure upon the pin 21 when the chair (the piece of furniture) supported by the castor is without load. Then, the locking member 15 will pivot sufficiently around the dowels 14 that the arcuate parts at the bottom of the recesses 17 in the flanges 16 of the locking member press against the hubs and brake the wheels. When the load upon the pivot rod 10 is increased by a person taking a seat on the chair, the locking member 15 is forced downwardly against the action of the leaf spring, so that the recesses 17 lose contact with the hubs, and the wheels thus become free to roll.

We claim:

1. A self-braking castor for a rollable article of furniture comprising:
   a support frame having an aperture extending axially therethrough;
   an axle mounted in said aperture having first and second wheels thereon disposed respectively on opposed sides of said support frame;
   pivot means on said support frame;
   a wheel braking and retaining lever carried by said support frame to be pivotable at one end thereof about said pivot means, said lever having an intermediate portion configured and dimensioned to be engageable with said wheels when pivoted into a first pivotable position to effect braking of the wheels and to be free of said wheels to permit rotation thereof when pivoted into a second pivotable position, said lever in both of said first and second pivotable positions being cooperable with said wheels to retain same on said axle;
   a pivot rod member carried by said support frame for reciprocation in a substantially vertical plane, said pivot rod member being engageable at its upper extremity by the article of furniture and operatively engageable at its lower extremity with the other end of said lever;

a bore formed in said support frame and a pin member positioned reciprocally within said bore and interposed between the lower extremity of said pivot rod member and said other end of said lever to thereby effectuate operative engagement of said pivot rod member and said other end of said lever;

and spring means carried by said support frame biasing said other end of said lever and thereby through the interposition of the pin member said pivot rod member upwardly, the spring force of said spring means being pre-set such that when a load below a predetermined value is transmitted from the article of furniture to the upper extremity of said rod member said lever is spring-biased into said first pivotable position and the wheels are braked whereas when the load transmitted from the article of furniture to the upper extremity of said pivot rod member exceeds said predetermined value the force of said spring means is overcome and said pivot rod member urges said lever into said second pivotable position to thereby remove the braking force from the wheels.

2. A castor according to claim 1 including a vertically extending bore formed in said support frame accomodating said pivot rod member therein.

3. A castor according to claim 2, including axially extending hubs on said wheels, each of said hubs having a centrally located bore dimensioned to receive one end of said axle, the free end of said hubs being provided with a radially directed flange, said lever having said intermediate portion thereof configured and dimensioned so as to be engageable with the hubs of the wheels to effect braking and to be axially outward of the hub flanges at all time so as to retain the wheels on said axle.

4. A castor according to claim 3, wherein said spring means comprises a leaf spring and including a second vertically extending bore in said support frame, screw means positioned in said second bore retaining said leaf spring in biasing engagement with said lever, said screw means being adapted to regulate the biasing force of said leaf spring on said lever.

5. A castor according to claim 1, wherein said lever, when viewed from its pivotable one end, is U-shaped and includes a pair of upwardly projecting flanges constituting the prongs of the U-shaped configuration, said flanges extending upwardly on the opposed sides of said support frame, said pivot means comprising axially extending dowels projecting from the respective opposed sides of said support frame, each of the flanges of said lever having an arcuate end face adapted to seat on one of said dowels to permit pivotal movement of said lever thereabout.

* * * * *